United States Patent Office 3,272,779
Patented Sept. 13, 1966

3,272,779
INTERPOLYMERS OF FORMALDEHYDE AND AROMATIC SULFONES
Murray H. Reich, Princeton, N.J., assignor to Ethyl Corporation, New York, N.Y., a corporation of Virginia
No Drawing. Filed Mar. 28, 1963, Ser. No. 268,569
12 Claims. (Cl. 260—67)

This invention relates to novel and useful high molecular weight high melting interpolymers composed principally of polyformaldehyde. This invention further relates to processes for producing these novel interpolymers.

It has been known in the past that formaldehyde was capable of being homopolymerized. Staudinger in "Die Hochmolekularen Organischen Verbindungen" (1932), set forth such a process. However, the formaldehyde polymers obtained by this process aged in air at 105° C. such that the polymer degraded or "unzipped" into monomeric formaldehyde. MacDonald, in U.S. Patent 2,768,994, discovered a now polymerization process whereby high molecular weight formaldehyde homopolymers could be produced which were tougher and withstood higher temperatures than the low molecular weight polymers of the prior art. However, this polymer which exhibited excellent properties at low temperatures tended to degrade or "unzip" at temperatures at which the polymer had to be worked. Thus, in molding operations which require high temperatures it was found that polyformaldehyde would degrade, rendering the polymer relatively useless for this valuable operation.

Many methods have been attempted to stabilize the high molecular weight formaldehyde homopolymers. A typical method employed utilizes the compounding with the formaldehyde polymer a stabilizer additive such as hydrazines (U.S. 2,810,708); phenols (U.S. 2,871,220); ureas and thioureas (U.S. 2,893,972); amines (U.S. 2,920,059 and 2,936,298); and benzophenones (Australian 230,163). The stabilizers are compounded into the polymer after the polymerization process. The stabilizers listed above seem to prevent, to some extent, oxidation and thermal deterioration. However, degradation is still experienced at high temperatures in the presence of air. Other methods employed to prevent the "unzipping" of the polyformaldehyde are by "end capping" of the hydroxyl groups on the chain ends of the polymer as set forth for example in U.S. Patent 2,964,500. This method is successful to a certain degree, but total success is not experienced since these end capped polymers will degrade at high temperatures and also in the presence of caustic or other strongly alkaline substances. Another method of stabilization included the essentially complete removal of the polymerization catalyst from the polymer since it was believed that the presence of a polymerization catalyst in the polymer caused degradation (U.S. Patent 2,989,509). Combinations of the foregoing methods have also been tried (Australian 229,481).

Elimination of the problem of thermal degradation has also been attempted by copolymerization of formaldehyde (trioxane) with cyclic ethers which are essentially homologous to monomeric formaldehyde (U.S. 2,989,509). Copolymerization of formaldehyde with alkylene carbonates as set forth in U.S. Patent 3,012,990 has also been achieved in an attempt to produce a thermally stable copolymer. However, under certain conditions these copolymers degrade in the presence of a caustic or other similar alkaline material. All of these methods have been successful to a certain extent but none have cured all of the shortcomings such as degradation.

It is therefore an object of the present invention to provide novel interpolymers which are stable to heat and resistant to oxidative deterioration and caustic degradation. It is a further object of the present invention to provide novel interpolymers which are tough, strong, flexible and elastic in nature. It is still a further object of the present invention to provide novel interpolymers of formaldehyde and a sulfone monomer which have beneficial qualities of the type outlined hereinabove. It is another object of the present invention to provide a process for producing the novel interpolymers having thermal and oxidative stability and exhibiting properties of toughness, strength and resilience. Other objects of this invention will be apparent from the ensuing description.

It has now been found that the above and other objects accomplished by the provisions of an interpolymer of formaldehyde and aromatic sulfone monomer having the formula

wherein R is an aromatic radical or alkyl substituted aromatic radical and R' is a radical selected from the group consisting of aryl, alkaryl, and alkyl. It is preferred that both R and R' are aromatic or substituted aromatic radicals. There must be a total of at least two free or unsubstituted positions on each of the rings. R and R' each generally have from 6 to about 140 carbon atoms. Generally, the amount of sulfone which may be present in the interpolymers of this invention ranges from about 0.1 mole percent up to about 15 mole percent based on the interpolymer. The preferred amount of said sulfone monomer ranges from about 1 up to about 10 mole percent. Excellent polymers are obtained especially where the most particularly preferred molecular percentage of sulfone monomer is employed, the copolymers exhibiting the characteristics of polyoxymethylene in that they are tough and resilient.

The sulfone monomer employed in this invention preferably contains from about 12 to about 60 carbon atoms, since the copolymers obtained exhibited superior properties of thermal stability, oxidative stability and stability to chemical degradation. Typical sulfone monomers which may be employed in this invention are diphenyl sulfone, 2,2'-dimethyl phenyl sulfone, 2-butyl-3'-ethylphenyl sulfone, 2,4-dodecyl-4-methyl phenyl sulfone, phenyl ethyl sulfone, 5,5'-dipropyl phenyl sulfone, 4-isobutyl phenyl sulfone, 2,6,2',6'-tetramethyl phenyl sulfone and the like.

Although not desiring to be bound by theoretical considerations, it is believed that in the novel interpolymers of this invention that sulfone monomer is bonded intermittently at random to the carbon atoms of the repeating formaldehyde molecule such as

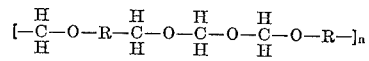

where R represents the sulfone group in the formaldehyde chain.

A different formula which shows the probable theoretical molecular structure is

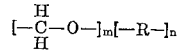

wherein $m$ is an integer representing the total number of polyoxymethylene groups in the polymer and $n$ is a smaller integer representing the total number of sulfone groups derived from the sulfone monomers that are present and scattered throughout the polyoxymethylene structure. Therefore, $n$ is from 0.1 to 15 percent of $m$.

The novel interpolymers of this invention have high molecular weights and high melting points. The molecular weights of these novel polymers generally range from about 5,000 to about 200,000. However, the preferred molecular weights range from about 10,000 to about 150,000 since the copolymers obtained in this range are more easily adapted for the ultimate end uses, i.e., molding, drawing fibers and the like. The molecular weight ranges are a direct function of the inherent viscosity. Thus, inherent viscosities ranging from about 0.3 to about 8.0 are desirable in the polymers of this invention. The most preferred inherent viscosities range from about 0.5 to about 5.0 since polymers having these viscosities are within the preferred molecular weight range. The inherent viscosity is preferably measured at 0.5 percent by weight in para-chlorophenol containing 2 percent alpha pinene at 60° C.

The melting point (polymer melt temperature) ranges of the novel interpolymers of this invention generally range from about 140° C. up to about 190° C. The most preferred melting point ranges for the polymers is from about 150° C. up to about 185° C. since polymers within this melting point range generally exhibit superior molding characteristics.

An important feature of the novel interpolymers of the present invention is the fact that severe thermal degradation or "the unzipping" effect is not experienced at elevated temperatures required for molding operations. Coupled with this advantageous feature is the fact that these novel interpolymers exhibit properties of toughness, resilience, strength and flexibility. Still another important feature of interpolymers of this invention is their resistance to degradation in the presence of strong caustic solutions. Formaldehyde homopolymers in the past rapidly decomposed into monomeric formaldehyde upon being treated with a strongly alkaline solution. This disadvantage is not experienced to the same extent with the present interpolymers and in many cases the only modification experienced when they are treated with a caustic solution is the removal of the terminal hydroxyl groups from the polymer. This is advantageous in that the remaining polymer is resistant to the action of acids, alkalies, heat, oxidation and aging. Thus, many of the disadvantages experienced in the prior art formaldehyde polymers have not been overcome, or at least significantly minimized.

The term "interpolymers" as used in this invention may be further defined as polymers containing two or more monomers as above defined, in the polymer chain. Thus, copolymers, terpolymers, tetrapolymers and the like are all within the ambit of this invention.

The novel interpolymers described herein are not to be confused with certain materials produced heretofore. Typical of these different materials are the compositions found in U.S. Patent 2,657,193 wherein sulfur containing compounds were polymerized in the presence of a strong mineral acid with an aldehyde to obtain amber colored hard thermosetting materials.

A further embodiment of the present invention relates to a process for producing the novel sulfone-formaldehyde interpolymers of this invention. The novel interpolymers of this invention are produced by polymerizing any reactive form of formaldehyde which is essentially anhydrous with one or more sulfone monomers having from about 12 to about 60 carbon atoms. This polymerization process is conducted in the presence of a catalyst, the nature of which largely depends upon the type of formaldehyde being used in the reaction. Thus, when trioxane is copolymerized with one or more sulfone monomers, a Lewis acid is generally employed. However, heterogeneous catalysts, e.g., silica-alumina, are also very active in this novel copolymerization process. Other catalysts such as Lewis bases are generally preferred when essentially anhydrous gaseous monomeric formaldehyde is employed in the copolymerization reaction.

The novel process of the present invention can be conducted utilizing a wide variety of polymerization techniques, i.e., bulk polymerization, solution polymerization, emulsion polymerization, vapor polymerization and like procedures.

Bulk polymerization is achieved by mixing a formaldehyde compound such as trioxane with a catalyst and the desired sulfone. Thereafter the reaction mixture is heated to a temperature between about 50° C. to about 120° C. for a period of time sufficient to copolymerize the reaction mixture. This reaction time generally varies from a matter of seconds up to one day, a period ranging from about 3 minutes to about 12 hours usually being sufficient. The resultant polymer obtained may then be ground up and molded, or previous to molding, subjected to purification, and/or subjected to other stabilization procedures, compounded with stabilizers or the like.

Solution polymerization generally comprises contacting formaldehyde such as trioxane with a catalyst and the desired sulfone in an inert solvent such as a liquid hydrocarbon at a temperature ranging from about −90° C. up to about 200° C. The reaction is generally conducted at a pressure ranging from about atmospheric up to about 20 atmospheres. The reaction is stirred and for a time sufficient to obtain the desired copolymer of the desired molecular weight after which the product is then extracted and allowed to dry. Again, subsequent treatments used in the art for improving the properties of polyformaldehyde may be used, if desired.

The inert solvents which may be employed in the solution polymerization process are any solvents which are inert to the reactants. Thus, the liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz., alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene and gasoline, halogenated hydrocarbon compounds such as carbon tetrachloride, ethylene dibromide, methylene chloride, glycol ethers such as the dimethyl ethers of diethylene glycol, the diethyl ether of diethylene glycol, monoethers such as diethyl ether, dibutyl ether, dicyclohexyl ether, dibenzyl ether, diphenyl ether, methyl phenyl ether and the like.

Vapor polymerization comprises contacting in a reaction zone the vapors of formaldehyde and the desired sulfone monomer in the presence of a catalyst at temperatures ranging from about −20 up to about 200° C. The pressure at which the vapor polymerization process can be conducted generally ranges from about atmospheric up to 200 atmospheres. The polymer may then be withdrawn as it is formed in the reaction chamber. Thereupon optional work-up and/or stabilization procedures may be utilized.

The processes as outlined above are capable of being adapted to a continuous process, a batch process or semibatch operation; for example, where vapor polymerization reaction is being conducted it may readily be converted to a continuous process by merely adding the reactants and catalysts to the reaction zone while recovering the interpolymer as soon as it is formed. An excellent example of a batchwise process is the bulk polymerization of a formaldehyde such as trioxane with a sulfone monomer after which the desired polymer may then be recovered.

Generally, it is preferred to employ an essentially anhydrous inert atmosphere over the reaction mass particularly when bulk polymerization techniques are being employed. However, an inert atmosphere may be employed in other polymerization processes such as the solution polymerization and vapor polymerization. Typical of the inert gases which may be employed are carbon monoxide, nitrogen, argon, krypton, neon, helium and the like. Certain saturated paraffinic hydrocarbons may also be employed as the inert atmosphere where the hydrocarbons are inert to the reaction mass. Examples of paraffinic hydrocarbons which may be employed are methane, ethane, propane and the like.

The formaldehyde employed, as stated hereinabove, can be any reactive form of formaldehyde in the essentially anhydrous state. Monomeric formaldehyde and trioxane are the best known reactive anhydrous forms which may be used. Monomeric formaldehyde can be produced by any of the general prior art methods such as is set forth by Walker in "Formaldehyde," A.C.S. Monograph Series No. 98 (1944). Typical methods employed to obtain monomeric formaldehyde are by pyrolyzing paraldehyde, polyoxymethylene, or other forms of formaldehyde. However, it is preferred in this invention to employ trioxane since it is easier to handle, especially in bulk polymerization processes. On the other hand, in vapor polymerization processes it is more desirable to employ gaseous monomeric formaldehyde which is essentially anhydrous since this compound is more easily vaporized.

Typical of the Lewis acids which are employed as catalysts in the process of this invention are the inorganic halides, particularly the inorganic fluorides, inorganic fluorides complexed with ethers and amines, metal alkoxides, sulfonyl halides, metalloidal halides, hydrogen halides and the like. The most preferred Lewis acid catalysts are boron trifluoride, boron trifluoride etherate complexes, and boron trifluoride amine complexes since excellent results are achieved in bulk polymerization processes employing trioxane as the formaldehyde reactant.

Typical of the Lewis bases which may be employed in the process of this invention, when utilizing gaseous monomeric formaldehyde as the formaldehyde monomer, are the organo phosphines, organo stibines, organo arsines, primary amines, secondary amines, tertiary amines, the alkali and alkaline earth hydroxides, oxides and peroxides and the like.

Other catalysts which may be employed in association with gaseous monomeric formaldehyde and sulfone monomers in the present polymerization process are onium salts, metals, metal alloys, metal carbonyls, as well as various oxides, peroxides and hydroxides.

The types of heterogeneous catalysts may be broadly defined as metal oxides, mixed metal oxides, acid clays, acid treated clays, and ion exchange resins. Acid types of heterogeneous catalysts generally are used in the polymerization of trioxane while the basic catalysts are employed in the polymerization of monomeric formaldehyde. However, acid ion exchange resins may be in some instances employed in both the copolymerization of trioxane or monomer formaldehyde and the sulfone monomer.

Typical examples of the heterogeneous catalysts are silica-alumina, silica magnesia, silica zirconia, alumina boria, alumina magnesia, silica gel, Permutit S-2 (which is understood to be aluminum silicate), alumina chromia, Amberlite IR (which is understood to be a phenolic methylene sulfonic cation exchanger produced by the reaction of phenol, formaldehyde and a sulfonic acid), montmorillonite and the like.

The amount of catalyst which may be employed in the process of this invention is susceptible of variation. Generally, amounts ranging from about 0.001 to about 5 percent by weight of the total reaction mass may be employed. However, the preferred amount of catalyst ranges from about 0.01 percent to about 2 percent by weight since within this range polymers having optimum properties such as strength, toughness and resilience are obtained. The amount of catalyst employed in the present invention, although not critical, forms an important element of the process. Thus, it is desirable to keep the catalyst concentration within the preferred range outlined above.

The temperature at which the polymerization process is conducted varies with the type of process employed. Thus, in bulk polymerization processes temperatures ranging between about 50° C. up to about 120° C. are employed. In the solution polymerization processes reaction temperatures may vary from about −90° C. up to about 200° C. whereas in vapor polymerization processess temperatures between about −20° C. up to about 200° C. are employed.

The combination of temperature and the amount of catalysts employed has a direct bearing on the molecular weight of the polymer which is produced via this invention. Thus, in general, high conversions of low molecular weight copolymers are obtained when high catalyst levels coupled with low polymerization temperatures are used. The same phenomenon occurs where a low catalyst concentration is employed coupled with high temperature. The preferred combination of temperature and amount of catalyst whereby a polymer having a high molecular weight or high inherent viscosity is produced involves use of a low catalyst level and low polymerization temperature. Thus, in a bulk polymerization process temperatures ranging between about 65° C. up to about 120° C. and catalyst concentrations varying from about 0.01 percent to about 2 percent (based on the total weight of monomers being used), are preferred in accordance with this invention. In the preferred solution polymerization process the temperature ranges from about 0° C. up to about 120° C., the catalyst concentration being the same as in the preferred bulk polymerization process.

The pressure employed in the polymerization processes of this invention depends generally on the type of formaldehyde, sulfone, and catalyst being used and on the type of process technique being utilized. Thus, in the solution polymerization and vapor polymerization procedures the pressure generally ranges from atmospheric up to about 20 atmospheres. It is preferred, for example, when using a sulfone monomer in the aerosol state to employ pressures higher than atmospheric—e.g., up to about 10 atmospheres since greater contact between or among the reactants is generally achieved within this pressure range. Furthermore, these mild pressure conditions obviate the necessity for expensive high pressure reaction equipment. In most cases, it is preferable to conduct the process of this invention at atmospheric or ambient pressures.

The processes by which these novel copolymers are produced will be further understood from the following examples. In all of the examples, all parts are by weight unless otherwise specified.

*Example I*

Diphenyl sulfone was copolymerized in four experiments with trioxane in the presence of boron trifluoride dibutyl etherate. The solution polymerization technique was employed. The diluent used in each instance was cyclohexane to which was added trioxane, the comonomer diphenyl sulfone, and the catalyst boron trifluoride dibutyl etherate. The reaction conditions and results are set forth in the data in Table I.

TABLE I.—THE POLYMERIZATION OF TRIOXANE AND PHENYL SULFONE

| Run No. | Polymer, Temperature, ° C. | Comonomer, phr. | Catalyst [1] | Time to Solidify, Min. | Conversion, Percent | PMT,[2] ° C. | Tm,[3] ° C. | $n_{inh}$[4] |
|---|---|---|---|---|---|---|---|---|
| A | 55 | 8.0 | 0.12 | 2.0 | 82.0 | 181 | 158 | 1.87 |
| B | 55 | 4.0 | 0.18 | 1.0 | 83.8 | 182 | 161 | 0.92 |
| C | 70 | 8.0 | 0.18 | 0.5 | 78.6 | 183 | 159 | 0.90 |
| D | 70 | 4.0 | 0.12 | 3.0 | 95.0 | 181 | 159 | 1.88 |

[1] Parts by volume.
[2] PMT—Polymer melting temperature.
[3] Tm—Crystalline melting point.
[4] $n_{inh}$—Inherent viscosity at 0.2% by weight in para-chlorophenol.

Similar copolymers are obtained when 4,4'-dihexyl phenyl sulfone, 4,5,6,4',5',6'-hexadodecyl phenyl sulfone, 4-isobutyl phenyl sulfone, 2,6,2',6'-tetramethyl phenyl sulfone and the like are employed as comonomers in the above example.

The copolymers of phenyl sulfone and trioxane produced in Example I and shown in Table I were subjected to caustic treatment and to extreme temperatures to test resistance to caustic degradation and thermal deterioration.

The caustic treatment was conducted as follows: A sample of the polymer obtained from each of the Runs A–C in Table I were treated with 5 parts per hundred diphenyl amine and were molded at 360° to 380° F. for two minutes. The polymer obtained in Run D was treated with 5 percent of cyano guanidine in lieu of the diphenyl amine for Examples A–C.

The plaques were weighed and then subjected for two hours to a boiling 10 percent sodium hydroxide solution. After this treatment, the plaques were reweighed to determine the percent of weight loss. The results of this caustic treatment for each of the copolymers are shown in the data set forth in Table II.

TABLE II.—RESISTANCE OF POLYMER TO CAUSTIC DEGRADATION

| Run No. | $n_{inh}$ | Caustic Resistance Weight Retention, Percent |
|---|---|---|
| A | 1.87 | 99.9 |
| B | 0.92 | 98.0 |
| C | 0.90 | 92.1 |
| D | 1.88 | 41.7 |

As seen from the above table the copolymers of this invention resisted caustic degradation and the net polymer loss ranged from about 58 percent to about 0.1 percent. It is thus noted that the copolymers of this invention have extraordinary resistance to caustic degradation.

The thermal stability test was conducted as follows. A sample of each of the polymers in powder form produced in Example I (Runs A–D) were weighed and subjected to a temperature of 222° C. for one hour and for two hours. The sample in each instance was reweighed to find the percentage weight loss. Samples of polymers produced in Runs A–C were each compounded with 5 parts per hundred of diphenyl amine, the polymer produced in Run D was treated with 5 percent cyano guanidine. Each treated polymer was weighed and subjected to 222° C. for one hour and two hours. The percentage of weight loss was then calculated. The results of the thermal stability test for each of the polymers are set forth in the data in Table III.

TABLE III.—THERMAL STABILITY TEST

| Run No. | 20 Min. No Stabilizer | 1 Hour No Stabilizer | 1 Hour Stabilizer | 2 Hours No Stabilizer | 2 Hours Stabilizer |
|---|---|---|---|---|---|
| A | 72.8 | 50.1 | 78.3 | 35.5 | 65.7 |
| B | 98.3 | 63.7 | 69.7 | 48.0 | 45.0 |
| C | 78.2 | 58.8 | 67.0 | 39.3 | 36.8 |
| D | 74.9 | 61.7 | 84.5 | 41.6 | 64.2 |

Similar excellent thermally stable copolymers are obtained when 2,2'-dimethyl phenyl sulfone, 2-butyl-3'-ethyl phenyl sulfone, 2,4-didodecyl-4'-methyl phenyl sulfone and the like are employed in place of the phenyl sulfone in Example I.

The novel interpolymers of the present invention are resistant to chemical degradation. When the copolymers of this invention are treated with a 10 percent aqueous sodium hydroxide solution at temperatures between room temperature and reflux temperature for from about one minute to about one hour, the net polymer loss ranges from about 2 percent to about 60 percent. Thus, in preparing the novel copolymers of this invention, it is desirable to first submit the raw copolymer product to a caustic treatment. Thus, in treating the crude copolymer it is desirable to use an alkaline solution having a pH of between about 8 and about 14 at about room temperature up to about 90° C. for a time ranging about 1 to about 10 minutes. For reasons of economy and time, it is desirable to contact the crude copolymers of this invention with a 10 percent aqueous sodium hydroxide solution. The products thus obtained are even more stable to heat, light and oxidation. The strong bases which can be used in this preferred after-treatment includes the alkali and alkaline earth metal hydroxides, oxides, carbonates, acetates and the like; strong organic bases; ammonia and the like. Typical examples of these bases which may be employed are potassium hydroxide, calcium oxide, barium hydroxide, magnesium oxide, sodium carbonate, sodium acetate, calcium propionate, ammonia, dimethyl amine, diethyl amine, dipropyl amine, dibutyl amine, tetramethyl guanidine and the like.

In effecting this after-treatment systems other than aqueous alkaline systems may be employed. Thus, the appropriate strong base may be dissolved in a solvent such as dimethyl formamide, benzyl alcohol, methanol, anisole, ethylene glycol, or the like. In some instances, alkaline solvent systems which contain a hydroxyl group such as benzyl alcohol, methanol and ethylene glycol, function as the agent of controlled degradation even in the absence of the above basic substances.

Typical of the Lewis acid catalysts which may be employed in the process of this invention are antimony trifluoride, antimony fluoborate, bismuth fluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, fluosulfonic acid, antimony chloride, stannous chloride, sodium fluoride, potassium fluoride, lithium fluoride, calcium fluoride, magnesium fluoride, barium fluoride, strontium fluoride, lead fluoride, ferric fluoride, ammonium fluoride, thionyl chloride, phosphorous trichloride, stannic chloride, titanium tetrachloride, zirconium chloride, boron trifluoride, diethyl etherate complex, boron trifluoride dibutyl etherate complex, boron fluoride complexes of aryl amines such as aniline, alpha naphthyl amine, pentanaphthyl amine, diphenyl amine and benzidine, boron trifluoride complexes of pyridine, phenothiazine, glycine, alpha alanine, semicarbazide, urea and the like.

Typical examples of Lewis base catalysts which may be employed in the process of this invention are triphenyl phosphine, tritolyl phosphine, trixylyl phosphine, trinaphthyl arsine, tributyl phosphine, triethyl stibine, dimethyl phenyl arsine, tricyclohexyl phosphine, methyl dioctyl stibine, dixylyl ethyl arsine, trimethyl amine, triethyl amine, trihexyl amine, diethyl amine, di-N-propyl amine, dioctyl amine, cyclohexyl amine, dicyclohexyl amine, piperidine, N-ethyl piperidine, morpholine, N-methyl morpholine, pyrrolidene, N-ethyl pyrrolidine, cesium hydroxide, strontium hydroxide, rubidium hydroxide, sodium hydroxide, potassium hydroxide, lithium hydroxide, barium hydroxide, calcium hydroxide, sodium oxide, sodium peroxide, barium peroxide and the like.

Typical examples of onium salts which may be employed as catalysts are trimethyl stearyl ammonium laurate, tetra-N-butyl ammonium laurate, triethyl benzyl ammonium laurate, benzyl trimethyl ammonium nonyl phenolate, dimethyl diammonium acetate, dimethyl diammonium benzoate, dimethyl dioctadecyl ammonium acetate, N,N-diethyl piperidinium chloride, tetra-N-butyl ammonium iodide, N-phenyl ethyl tetramethylene ammonium iodide, dibutyl octadecamethylene ammonium acetate, bis-(tri-N-butyl ammonium iodide)propane, betaine methyl ester of N-methyl-N-phenyl glycine, 1-(carboxy methyl) pyridinium betaine, (carboxy methyl) tridecyl ammonium chloride, triethyl octadecyl phosphonium bromide, tetraethyl phosphonium iodide, tributyl ethyl phosphonium iodine, phenyl ethyl pentamethyl phosphonium acetate, bis-(triethyl phosphonium acetate) butane, tributyl sulfonium bromide, trimethyl sulfonium iodide, phenyl dibutyl sulfonium acetate, cyclohexyl diethoxy sulfonium benzoate and the like.

Metal alloy catalysts which may be employed in the process of this invention are alloys of aluminum with copper, silver, gold, beryllium, magnesium, calcium, strontium, barium, zinc, cadmium, mercury, silicon, titanium, zirconium, germanium, tin, lead, vanadium, niobium, tantalum, antimony, bismuth, chromium, molybdenum, tungsten, manganese, iron and nickel. Specific alloys which have been satisfactory in the past are aluminum magnesium alloys, aluminum cobalt alloys, aluminum copper alloys, aluminum copper manganese alloys, aluminum silicon alloys, aluminum zinc alloys, aluminum magnesium titanium alloys, and alloys containing aluminum, cadmium, calcium and lithium as well as amalgams of all of the alloys listed hereinabove.

Typical of the organometallic compounds which may be used in the process of this invention as catalysts are phenyl lithium methoxy phenyl sodium, decoxy sodium, copper mercaptide, copper abietate, copper stearate, methyl magnesium iodide, phenyl magnesium bromide, diethoxy magnesium calcium hydride, dimethyl cadmium, diphenyl mercury, calcium isopropoxide, aluminum stearate, tetraisopropyl titanate, diphenyl tin, triphenyl bismuth, dicyclopentadienyl iron, triethyl aluminum, trimethyl aluminum, tri-n-butyl aluminum, triisopropyl aluminum, cobalt carbonyl, iron carbonyl, nickel carbonyl and the like.

Typical of the heterogeneous mixtures of catalysts which may be employed in the process of this invention are silica alumina, Amberlite IR (acid form) as described hereinbefore, montmorillonite (mixture of silica alumina and magnesia), silica gel, Permutit S-2 (basic form) as described hereinbefore, alumina chromia, silica magnesia, silica boria, silica zirconia, alumina boria, as well as other metal oxides, mixed metal oxides and ion exchange resins.

Other forms of heterogeneous catalysts which may be used in the process of this invention are disclosed in "Ion Exchange Technology," Academic Press, New York (1956); "Ion Exchange Resins," by Kunin and Myers, John Wiley and Sons (1950); and "Dowex Ion Exchange," The Dow Chemical Company (1958).

Typical examples of other aromatic sulfone monomers which may be employed in the present invention are 4-methyl phenyl sulfone, 3,4,5-trimethyl phenyl sulfone, 2,3,4,5-tetramethyl phenyl sulfone, 4,4'-diethyl phenyl sulfone, 3,4,3',4'-tetraethyl phenyl sulfone, 2,3,4,5,2',3',-4',5'-octaethyl phenyl sulfone, 4-methyl-4'-ethyl phenyl sulfone, 4-cyclohexyl phenyl sulfone, naphthyl sulfone, beta-naphthyl phenyl sulfone, alpha-naphthyl ethyl sulfone, 4-octadecyl phenyl sulfone, 4,4'-didotriacontyl phenyl sulfone, phenyl triacontyl sulfone, 4,4'-dioctyl phenyl sulfone, 2,3,5,6,2',3',5',6'-octaisobutyl phenyl sulfone, 2-methyl-3-propyl-5'-isobutyl phenyl sulfone, 3,3'-dioctadecyl phenyl sulfone and the like.

Although the polymers of this invention have improved resistance to chemical and physical degradation, nevertheless for some uses it may be desirable to make use of previously known stabilization techniques in order to effect still further improvement in stability. The techniques which may be so used are in general those procedures which have heretofore been successfully used with hitherto known polyformaldehyde polymers and copolymers. Therefore stabilizer additives may be compounded with the novel polymers of this invention. Typical of these stabilizer additives are hydrozines (U.S. 2,810,708); hydrozones (Belgian 597,962); phenols (U.S. 2,871,220); ureas and thioureas (U.S. 2,893,972); sulfides and polysulfides (Belgian 509,409); amines (U.S. 2,920,-059 and 2,936,298); oxalic diamides (Belgian 584,257); polysulfonic acids (Belgian 585,164); hydroxy anthroquinone (Belgian 585,165); and benzophenones (Australian 230,163). There stabilizers may be compounded with the novel interpolymers of this invention after the polymerization reaction has been completed, Similarly the interpolymers may be end capped in lieu of the preferred caustic after treatment step by reacting the terminal hydroxyl groups of the copolymer with an anhydride such as acetic anhydride (U.S. 2,964,500); or a dialkyl acetal (Belgian 570,884); to esterify the groups.

The polymers may also be subjected to a combination of the compounding of stabilizers and end capping. Thus, one may end cap the crude polymer by reacting the polymer with an anhydride and thereafter compound stabilizers such as hydrazines, phenols, ureas and the like with the polymer product.

Another technique by which additional stabilization may be achieved is to rigorously remove catalyst residue from the novel polymers of this invention. Thereupon, if desired, a stabilizer additive or end capping procedure, or both, may be utilized.

A still different combination which may be used to further stabilize the interpolymers involves caustic treatment followed by addition of stabilizers. Any of the stabilizers referred to hereinabove may be employed subsequent to the preferred caustic after treatment step. This combination of caustic after treatment and subsequent addition of stabilizers is the most preferred method of giving additional stabilization to the interpolymers of this invention.

In all cases where a stabilizer additive is used, it is compounded with the interpolymer in a proportion of between about 0.003 and 15 percent by weight, based on the weight of the polymer. It should be noted that the stabilizers may, in some instances, be added prior to the caustic degradation step. However, it is preferred in most instances to add the stabilizers after the caustic degradation step since a polymer is obtained via this method which is more resistant to thermal degradation and oxidative deterioration.

The copolymers of this invention are useful for the preparation of film (as disclosed in U.S. 2,952,878), sheets, funicular structures such as fibers, filaments, bristles, rods, tubes and molding powders. Thus, the copolymers of this invention may be employed in any general use for which known tough and thermally stable thermoplastic polymers have been put.

Typical methods of molding the interpolymers of this invention are those techniques set forth in "Polymer Processes," vol. X, "High Polymers" by Schildknecht, Interscience Publishers, New York (1961). Typical of the described techniques at page 688 are compression molding, jet molding, transfer molding, injection molding, extrusion, etc.

Having thus described this unique invention and its embodiments, it is not intended that this invention be limited except as set forth in the following claims.

What is claimed is:

1. A high molecular weight linear thermoplastic copolymer of
    (a) a formaldehyde selected from the group consisting of essentially anhydrous monomeric formaldehyde and essentially anhydrous trioxane, and
    (b) an aromatic sulfone having the formula

wherein R is selected from a group consisting of aromatic radicals and alkyl substituted aromatic radicals and R' is selected from a group consisting of aryl, alkaryl, alkyl and hydrogen, R and R' each having up to about 60 carbon atoms; the amount of said aromatic sulfone monomer chemically combined in said copolymer ranging from about 0.1 mole percent up to about 15 mole percent of the copolymer; said copolymer being characterized by having a polymer melting temperature of from about 140° C. up to about 190° C.

2. The composition of claim 1 wherein said amount ranges from about 1 up to about 10 mole percent.

3. The composition of claim 1 wherein said amount ranges from about 2 to about 5 mole percent.

4. The composition of claim 1 wherein said aromatic sulfone monomer is diphenyl sulfone.

5. The process of preparing a high molecular weight high melting linear thermoplastic copolymer comprising copolymerizing under essentially anhydrous conditions a formaldehyde selected from the group consisting of essentially anhydrous monomeric formaldehyde and essentially anhydrous trioxane in admixture with an aromatic sulfone monomer containing up to about 60 carbon atoms and a polymerization catalyst; said aromatic sulfone monomer being employed in an amount ranging from about 0.1 to about 20 mole percent of said formaldehyde.

6. The process of claim 5 wherein said formaldehyde is essentially anhydrous trioxane.

7. The process of preparing a high molecular weight linear thermoplastic copolymer comprising copolymerizing under essentially anhydrous conditions essentially anhydrous trioxane and diphenyl sulfone in the presence of a Lewis acid catalyst; said diphenyl sulfone being employed in an amount ranging from about 0.1 mole percent to about 15 mole percent of said trioxane.

8. A high molecular weight linear thermoplastic copolymer of
    a. essentially anhydrous monomeric formaldehyde, and
    b. a diphenyl sulfone in which each phenyl group is substituted with no more than 3 lower alkyl groups;
the amount of said diphenyl sulfone chemically combined in said copolymer ranging from about 0.1 mole percent up to about 15 mole percent of the copolymer; said copolymer being characterized by having a polymer melting temperature of from about 140° C. up to about 190° C.

9. A high molecular weight linear thermoplastic copolymer of
    a. essentially anhydrous trioxane, and
    b. a diphenyl sulfone in which each phenyl group is substituted with no more than 3 lower alkyl groups;
the amount of said diphenyl sulfone chemically combined in said copolymer ranging from about 0.1 mole percent up to about 15 mole percent of the copolymer; said copolymer being characterized by having a polymer melting temperature of from about 140° C. up to about 190° C.

10. The process of preparing a high molecular weight linear thermoplastic copolymer comprising copolymerizing under essentially anhydrous conditions essentially anhydrous monomeric formaldehyde with a diphenyl sulfone monomer in which each phenyl group is substituted with no more than 3 lower alkyl groups, in the presence of a Lewis base catalyst; said diphenyl sulfone monomer being employed in an amount ranging from about 0.1 to about 20 mole percent of said monomeric formaldehyde.

11. The process of preparing a high molecular weight linear thermoplastic copolymer comprising copolymerizing under essentially anhydrous conditions essentially anhydrous trioxane with a diphenyl sulfone monomer in which each phenyl group is substituted with no more than 3 lower alkyl groups, in the presence of a Lewis acid catalyst; said diphenyl sulfone monomer being employed in an amount ranging from about 0.1 to about 20 mole percent of said monomeric formaldehyde.

12. The process of claim 7 wherein said Lewis acid catalyst is boron trifluoride dibutyl etherate.

References Cited by the Examiner
UNITED STATES PATENTS

| | | | |
|---|---|---|---|
| 2,543,237 | 2/1951 | Evans et al. | 260—67 |
| 2,915,560 | 12/1959 | Steinhardt et al. | 260—67 |
| 3,027,352 | 3/1962 | Walling et al. | 260—67 |

OTHER REFERENCES

Derwent Belgian Patents Report, Vol. N.D., No. 3, page 3 (July 17, 1963), For. Pat. Jor.

SAMUEL H. BLECH, *Primary Examiner.*

WILLIAM H. SHORT, *Examiner.*

L. M. MILLER, *Assistant Examiner.*